April 3, 1951 W. F. WORDEN 2,547,354
CENTER MARKING CALIPER
Filed April 25, 1945

INVENTOR.
WALTER FRANK WORDEN.
BY Joshua R. H. Potts
HIS ATTORNEY.

Patented Apr. 3, 1951

2,547,354

UNITED STATES PATENT OFFICE 2,547,354

CENTER MARKING CALIPER

Walter Frank Worden, Philadelphia, Pa.

Application April 25, 1945, Serial No. 590,130

1 Claim. (Cl. 33—191)

This invention relates to measuring and marking devices and is concerned primarily with a device which combines the features of a conventional caliper with a center locating and marking device.

In the broad field of small tools used in laying out work, the conventional spring caliper has been used for taking measurements of outside diameter as well as inside diameter, and only the shaping of the legs and points differentiates the two types of calipers. It is well known in geometry that if the precise cross measurement is determined, the exact center can be located. However, a considerable amount of extra work and number of possibilities of error are present in such an operation.

An object of this invention is to provide a combined caliper and center marking device with which it will be possible to locate and mark the precise center of a workpiece at the time the measurement is taken with the caliper, and to do so with an assurance that the correct center is located and marked.

A further object of this invention is to provide a device of the character just described in which a minimum adaptation of familiar and tested construction of the art is needed, and yet be able to provide a new and useful result.

Another object is the provision of such a device in which the center marking device may be held tightly in vertical adjustment while the cooperating connections between the measuring legs and center marker are moved with respect to each other.

Another object is the provision of such a combined device in which the location of the center between opposed measuring points is located automatically with certainty, leaving only the additional effort required to mark the workpiece with the scriber carried by the device itself in order to permit further operations, depending upon a correct center, to be carried on.

My invention, therefore, comprises a measuring device having opposed points, carried by legs which may be moved with respect to each other, so as to gauge a rectilinear dimension, a center marking instrument arranged to bisect the distance between the points of the spaced measuring points carried by the opposed legs, and means for maintaining the marking device in bisecting relationship to the points.

Other objects will appear hereinafter as the description proceeds and a more complete understanding of my invention will be had by reference to the accompanying drawing, in which.

Figure 3:
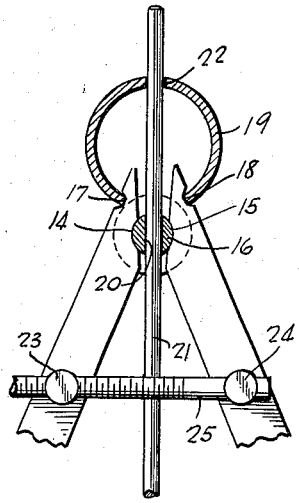
Figure 3 is a detailed view with parts broken away, and illustrating the fulcrum pin and the relation of the scriber or centering pin with respect thereto.
Figure 1:
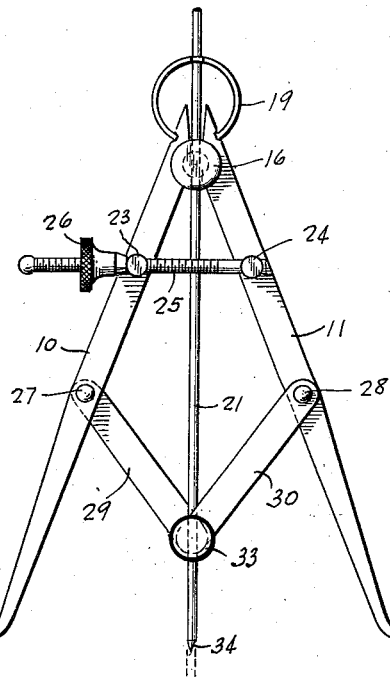
Figure 1 is a front elevational view of my device with the center marking scriber pin in position for marking the center between the opposed measuring points.
Figure 2:
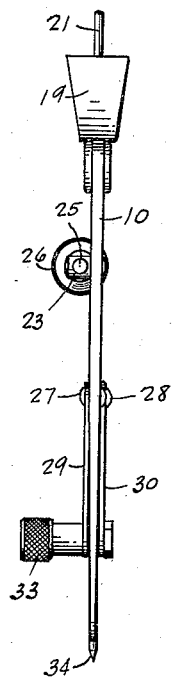
Figure 2 is a side elevational view.

Referring now to Figures 1 and 3, my invention comprises a pair of opposed legs 10 and 11 provided with measuring points 12 and 13, respectively. Adjacent their upper ends, legs 10 and 11 are provided with arcuate recesses 14 and 15, respectively, and a fulcrum pin 16 is received in these arcuate recesses. Adjacent the upper extremities of legs 10 and 11, on the outside thereof, are provided notches 17 and 18, respectively, which receive the opposed ends of a split ring-like spring clip 19.

Fulcrum pin 16 is provided with a vertically extending bore 20 in which is received a scriber shaft 21, the upper end of which passes through an opening 22, of appropriate shape, in spring 19.

Beneath the fulcrum pin 16 and upon each of legs 10 and 11, studs 23 and 24, respectively, are pivotally mounted, and through aligned bores in these studs a threaded adjusting bar 25 is passed. One end of the threaded adjusting bar 25 is secured in the bore of stud 24, while a threaded portion of the adjusting bar 25 is slidably received in the bore of stud 23.

A knurled adjusting nut 26 is carried by the threaded portion of adjusting bar 25 and adapted to exert pressure against stud 23 in opposition to the contraction of spring 19, which tends to separate the legs 10 and 11.

Figure 4:
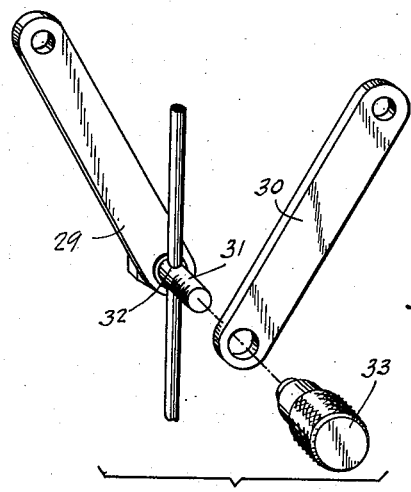
Figure 4 is an exploded view of adjusting and locking parts of the scriber mounting.

Beneath the bar 25 and on legs 10 and 11, pins 27 and 28, respectively, pivotally support links 29 and 30 at their upper ends, while their lower ends are pivotally connected by a threaded bolt 31, through which is provided a bore 32 for reception of a portion of the scriber shaft 21. It will be noted that an annular shoulder is provided on bolt 31 adjacent its head and is of sufficient depth axially to extend through the lower opening in link 29 and beyond its inner face as shown in Figure 4. A knurled lock nut 33 is provided with an annular shoulder at its inner end and this shoulder extends inwardly beyond the inner face of link 30.

When nut 33 is tightened upon the thread of bolt 31, shaft 21 is clamped between the annular shoulder of bolt 31 and that of nut 33 but the lower ends of links 29 and 30 may pivot freely upon the axis of bolt 31, even while the shaft 21 is clamped between said shoulders. A hardened point 34 is carried by the lower end of scriber shaft 21.

Figure 5:
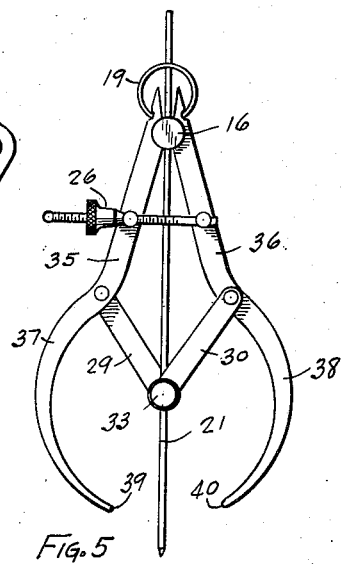
Figure 5 is a side elevational view of a combined outside caliper and center marking device.

In Figure 5 is shown a device substantially similar to that of Figure 1, except that the legs 35 and 36, respectively, are provided with bowed portions 37 and 38, respectively, with inwardly extending measuring points 39 and 40.

Figure 6:
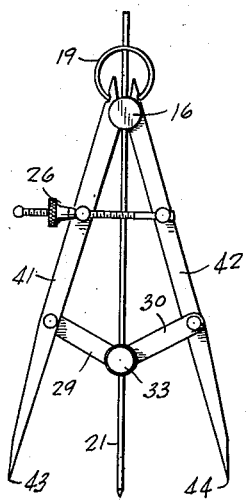
Figure 6 is a view similar to Figures 1 and 5, but showing my invention applied to a conventional pair of dividers.

In Figure 6 is shown a device substantially similar to that of Figure 1, except that the legs 41 and 42 are of the divider type and carry divider points 43 and 44, respectively, at their lower ends.

The operation and use of these devices will be well understood by those familiar with the problems of laying out work at the bench, and a brief description only is needed.

If we assume that it is desired to cut or drill a channel shaped bar on the exact center line between the opposed and upstanding flanges, the points 12 and 13 would be placed within the channel and then expanded until they come into contact with the opposed flanges. Knurled nut 33 would then be loosened so that scriber point 34 could be brought into contact with the web between the flanges, and a tightening of the nut 33 would secure the scriber in proper position. By moving the device between the opposed flanges and by further pressure of the scriber point upon the web, the precise center between the flanges would be marked.

If it were desired to mark the center between outside measurements of a similar workpiece, the device shown in Figure 5 would be used, with the opposed points 39 and 40 resting on the outside face of the opposed flanges. A proper adjustment of the scriber point, in the manner just described, would then make it possible for the user to mark the precise center between the outside faces of the opposed flanges.

With the device shown in Figure 6, a draftsman may locate the precise center of a straight line without the trouble or possibility of error present in the conventional practice of striking intersecting arcs and then drawing a line through the intersecting points, so as to bisect the desired line.

It can be readily seen that even though the opposed legs of the device are moved, the pivotally mounted links 29 and 30 will hold the portion of scriber shaft 21 extending through the bore of bolt 31, in the precise center between the opposed points of the device employed, while the portion of the scriber shaft passing through the bore of the fulcrum pin will be similarly held in proper position to bisect the angle made by the converging ends of the legs. Thus, there is no need for manual adjustment of the scriber point between the measuring points and possibilities of error, as well as extra effort, are obviated.

While I have illustrated my preferred form of construction, I do not wish to be limited to the precise details shown and described herein, but wish to avail myself of the variations coming within the proper scope of the appended claim.

What is claimed is:

In a device of the character described, a pair of complemental legs arranged at an angle with respect to one another, each of said legs having an inclined end face formed with a recess with the recesses in the two faces in confronting relation, a pivot pin in said recesses and formed with a bore transverse to the axis thereof, each of said legs having a notch formed in its outer edge opposite to the inclined end face thereon with the notches offset with respect to the axis of said pivot pin, a split ring band spring having ends received in said notches and formed with a central opening in alignment with said bore, a screw member operatively connected to said legs and adapted to cooperate with said spring to vary the angle therebetween, a link pivotally connected to each leg, a screw bolt formed with a bearing portion that is journaled in the end of one of said links remote from the pivotal connection thereof, said bolt also having a head and an annular shoulder with said bearing portion therebetween and a transverse passage in alignment with said bore and opening, a bushing threaded on said bolt and having an annular shoulder and a finger engaging portion with a bearing surface therebetween that is journaled in the other of said links, and a scriber member passing through said aligned bore, opening, and passage and adapted to be clampingly engaged between the shoulders on said bolt and bushing.

WALTER FRANK WORDEN.

REFERENCES CITED

The following references are of record in the file of this patent:

UNITED STATES PATENTS

| Number | Name | Date |
|---|---|---|
| 50,173 | Shurtleff | Sept. 26, 1865 |
| 497,071 | Gardiner | May 9, 1893 |
| 772,334 | Bornheimer | Oct. 18, 1904 |
| 809,887 | Amendt | Jan. 9, 1906 |
| 1,108,706 | Coffman | Aug. 25, 1914 |
| 1,150,556 | Thompson | Aug. 17, 1915 |
| 1,284,372 | Lawrenz | Nov. 12, 1918 |
| 1,617,453 | Milleman | Feb. 15, 1927 |